May 27, 1930.  R. C. GALLINANT  1,760,488
VEHICLE SIGNAL SWITCH
Filed April 5, 1930  2 Sheets-Sheet 1
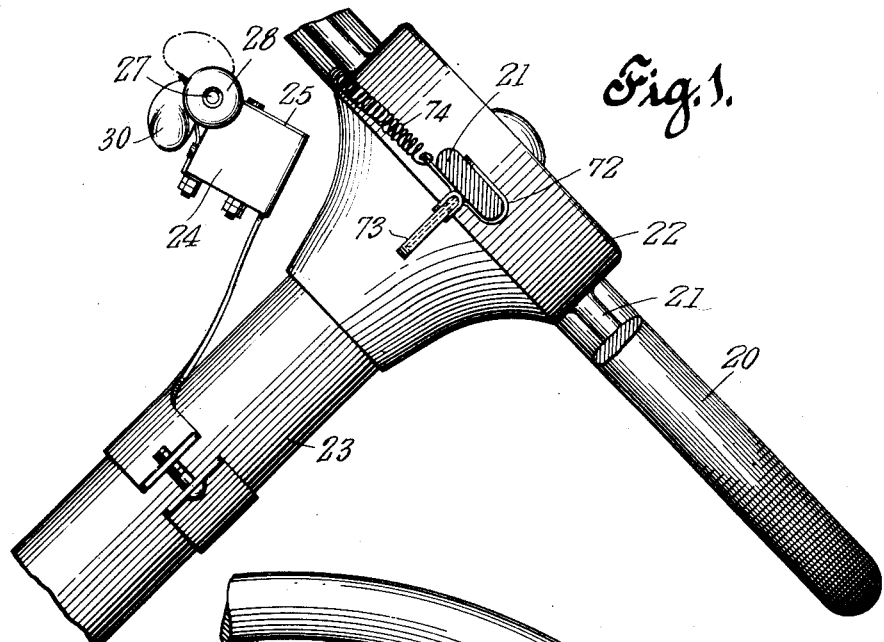
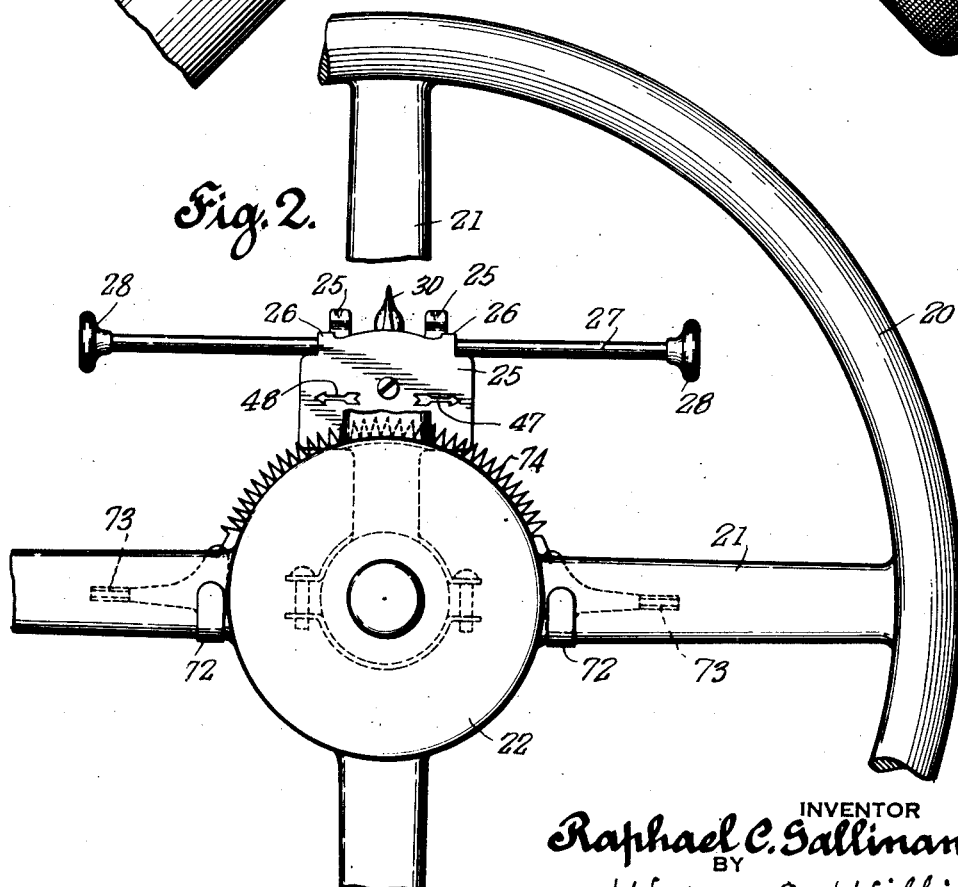
INVENTOR
Raphael C. Gallinant
BY
Warren E. Willis.
ATTORNEY May 27, 1930.  R. C. GALLINANT  1,760,488
VEHICLE SIGNAL SWITCH
Filed April 5, 1930    2 Sheets-Sheet 2
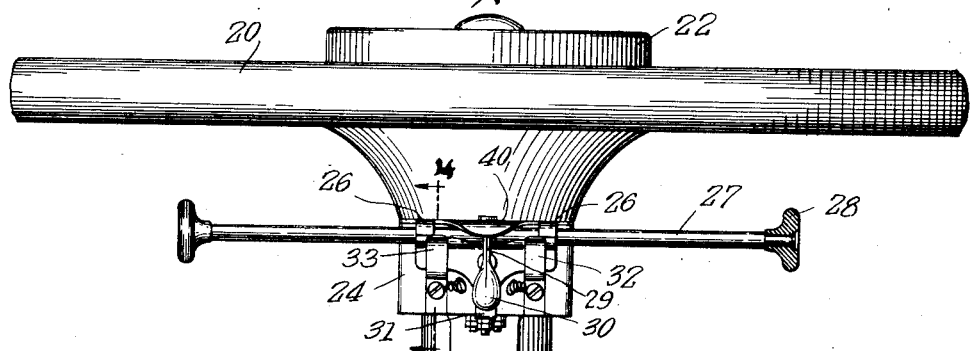
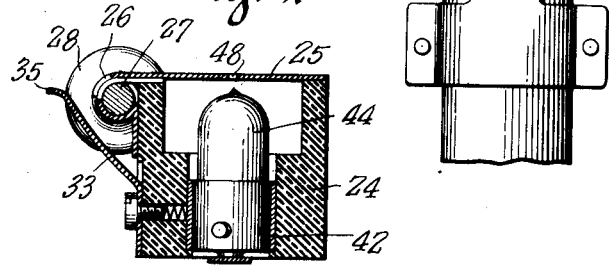
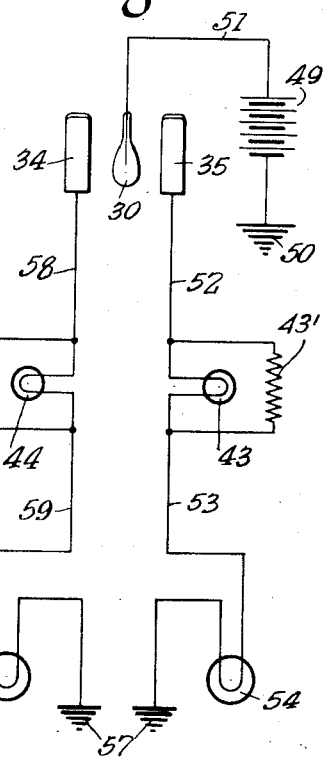
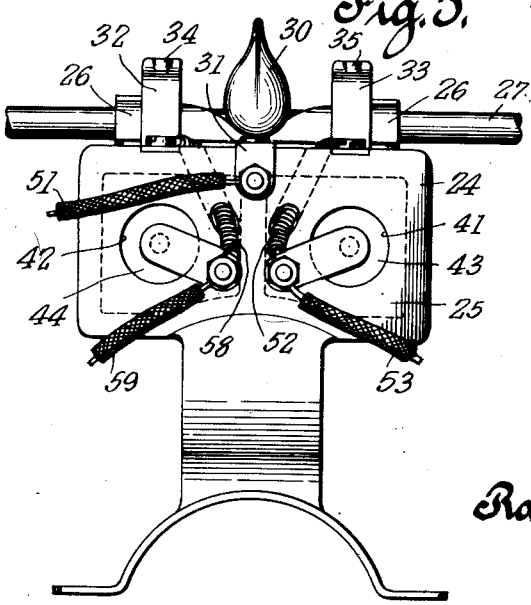
INVENTOR
Raphael C. Gallinant
BY
Warren E. Willis.
ATTORNEY Patented May 27, 1930

1,760,488

UNITED STATES PATENT OFFICE

RAPHAEL C. GALLINANT, OF RIDGEFIELD PARK, NEW JERSEY

VEHICLE SIGNAL SWITCH

Application filed April 5, 1930. Serial No. 441,762.

This invention relates to vehicle signals by which an operator is able to visually indicate the direction in which it is purposed to turn, and is a continuation in part of an abandoned application on vehicle signals, filed June 5, 1928, Serial Number 283,056.

The present hazardous and disagreeable practice of signalling by extending the hand from the side of a car is absurd and inefficient as the operator must release one hand from the steering wheel; furthermore, a hand so extended cannot be seen in the dark, particularly if it is some distance from traffic in the rear, and such hand signalling, in cold and stormy weather, is distinctly undesirable.

It is therefore one of the objects of the present invention to provide signals, visible from the front and rear, which will show the proposed turning direction of the vehicle, and also tell-tale lights operating in accordance, in full view of the operator and without removing the hands from the wheel.

A further feature is in the provision of a simple operating means so arranged as to cause display of the signal by a light touch from either hand of the operator, moved naturally in the intended direction, and to extinguish the signal and tell-tale lights automatically, without volition on part of the operator, upon turning the steering wheel to bring the vehicle upon a straight course.

These and other advantageous objects are accomplished by the novel design, construction and arrangement of parts as hereinafter described and shown in the accompanying drawing, forming a material part of this disclosure, and in which:—

Figure 1 is a side elevational view of a conventional steering wheel and post, showing an application of the device.

Figure 2 is a top plan view of the same.

Figure 3 is a front elevational view thereof.

Figure 4 is a sectional view taken on line 4—4 of Figure 3.

Figure 5 is a bottom plan view of the switch complete.

Figure 6 is a schematic view of the electric circuits used in the switch and signals.

The device is applicable to any vehicle having a steering wheel 20 provided with a spider having arms or spokes 21 radiating from a hub 22 at the upper end of a steering post 23, all these elements being of the usual type.

Carried in any suitable manner at the back or preferably at the front of the steering post 23, slightly below the wheel hub, is a dielectric block 24 having on its upper face a metal plate 25 shaped at its downwardly extending ends to present a pair of spaced bearings 26 in which a rod 27 is slidably and rotatably mounted.

The rod is preferably reduced at its ends and rotatably engaged thereon are knobs 28 suited to be pushed or pulled in either direction in shifting the rod in its bearings.

Set centrally in the rod is an arm 29 carrying a heavy contactor 30 provided with a bevelled upper edge, the arm normally being seated by gravity on a metal support 31 carried centrally on the front side of the block 24 in electrical engagement with the plate 25.

Secured to the insulating block 24 at the front near its ends, are metal arms 32—33 having at their outer, forwardly projecting ends notched contacts 34—35.

Formed on the plate 25 is an outstanding curved lip 40, constituting in effect a cam by which the arm 29 is guided when moved from one position to another.

Mounted in the block 24 are sockets 41—42 to receive small electric tell-tale lamps 43—44 below the plate 25 which is perforated to show directional characters 47—48, as arrows, visible to the operator showing that the signal lights, hereafter described, are correctly displayed.

A source of electric energy, as the battery 49, see Figure 6, has one pole grounded at 50, the other pole being connected by a conductor 51 to the contactor 30, which, in its normal central position, is neutral by reason of resting on the grounded seat 31.

It will now be understood that upon pushing or pulling either of the knobs 28 to the right or left, when about to turn the car correspondingly, the rod 27 will slide in its bearings, causing the contactor 30 to engage either of the fixed contacts 34 or 35 in accordance with the direction the rod is moved.

For instance, if the rod and contactor are moved to the left, the lower edge of the contactor will engage and eventually rest in the notch of the fixed contact 35, which is connected by a conductor 52 leading to the socket 41 in which is the tell-tale lamp bulb 43, causing it to emit light, return current passing through a conductor 53 to the main signal lamp 54, and thence by conductor 56 to the ground at 57.

Similarly if the contactor 30 be moved to the right to engage the notch of the fixed notch 34, current will pass from the contact through the conductor 58, socket 42, tell-tale lamp 44 and a conductor 59 leading to the signal lamp 60, return current passing through the conductor 70 to the ground 57.

Vehicles of the type on which such signalling apparatus is adapted for use are commonly provided with primary batteries of six volt capacity. The lamps 54—60, used for signalling purposes are preferably of from fifteen to twenty-one candle power, but the tell-tale lamps 43—44, at the switch are desirably of lesser power, two candle power being ample.

This condition is obtained by the use of shunt conductors, having resistance coils 43'—44' in their lengths, interposed in the circuit between the conductors 52—53, and conductors 58—59, such resistance coils being accurately proportioned for their purpose and old in the art.

This results in effect as a safety device by which the signal lamps will continue to operate should the tell-tale lamps fail to function for any cause, the current then passing through the resistances, but it will be obvious that in case the signal lamps fail, the corresponding tell-tale lamp becomes inoperative; it will also be apparent that in the event the signal is incorrectly displayed, it is instantly indicated by the tell-tale light permitting correction to be made prior to turning the steering wheel.

The knobs are moved to bring the contactor into operative engagement selectively with either of the fixed contacts in any easy and natural manner in the direction it is proposed to turn the vehicle, the action being substantially spontaneous, requiring no special effort or thought.

Displacement and return of the contactor is accomplished automatically upon turning the steering wheel to bring the vehicle upon a straight course, after the turn has been fully and completely made in the following manner.

Adjustably attached to the spokes 21 of the steering wheel are one or more clamps 72 in which are carried spring fingers 73; the clips or clamps 72 being held in operative engagement by a coiled tension spring 74 as seen in Figures 1 and 4.

The position of the finger, or fingers, for preferably two are used, is normally over the center of the block 24 when the vehicle is on a straight course and it will be understood that the finger 73 will yield upon making contact with the contactor 30 and pass over it in one direction, that is the direction the car is to be turned, while if the wheel is moved reversely, to direct the vehicle on a straight course, it will engage the contactor, moving it out of its notch and thence by gravity, assisted by the lip 40, it will drop to the seat 31 and there remain until moved by hand into a signal displaying position.

It is to be noted that the type of a switch may be used in connection with any electric signalling device as well as that indicated, that its action is dependent upon mechanical effects and gravity, no springs of any knid being used.

Its installation is simple and convenient, no cutting, drilling or mutilation of the car being required; its application to vehicles using any kind of tires and having different turning radius is accomplished with equal facility, and in connection with any known type of indicating signals whatever.

Although the preferred embodiment of this invention has been described with reference to a particular detail, it is understood that minor changes in construction and details thereof may be made without departing from the scope of the appended claims.

Having thus described the invention, what is claimed as new and desired to secure by Letters Patent, is:—

1. In combination with a wheeled vehicle having a steering wheel and post, of a dielectric block fixed on said post, contacts carried by said block, a round rod slidably mounted on said block, a heavy contactor arm secured rigidly to said rod engageable solely by gravity with either of said contacts, said rod being manually slidable in either direction, and flexible means adjustably carried by the steering wheel to retract the arm from either contact.

2. In combination with a wheeled vehicle having a steering wheel and post, of a dielectric block fixed on said post, contacts carried by said block, a rod extending slidably and rotatably through said block, a weighty contactor secured rigidly on said rod engageable directly with either of said contacts upon movement of the rod endwise, a cam controlling the path of said contactor, pivoted actuating knobs on said rod, and means adjustably carried by the steering wheel to move said contactor into a neutral position.

3. In combination with a wheeled vehicle having a steering post and a steering wheel, of a dielectric block fixed on said post, contacts carried by said block, a horizontally slidable rod in the block, a contactor arm fixed on said rod having a heavy flattened head engageable by gravity directly with either of said contacts upon movement of the rod, said rod being manually movable, and a flexible finger fixed to said steering wheel to displace said rod carried arm upon movement of the wheel to normal position.

4. In combination with a wheeled vehicle having a steering post and a steering wheel, of an insulate block fixed on said post, contacts carried by said block, a rod horizontally slidable in the block, a contactor arm fixed on said rod having a heavy flattened head engageable by gravity to make direct contact with either of said contacts upon longitudinal movement of the rod, means to manually actuate said rod, said means being rotatably mounted on the ends of said rod, and a flexible finger carried by said steering wheel to displace said contactor arm upon turning the wheel to its normal position.

5. A signal switch comprising a dielectric support block, a pair of spaced contacts fixed on said block, a rod slidably engaged with the block, knobs rotatably mounted on the ends of said rod, a weighty contact arm rigid on said rod to make direct positive contact with either of said fixed contacts upon movement of the rod in a desired direction, and a cam shaped guide for said arm, said guide having a depression to cause semi-rotation of said rod as it is moved longitudinally.

6. A signal switch comprising an insulate block, a pair of contacts fixed in spaced relation on said block, a plate on said block having alined horizontal bearings at its forward edge, a cylindrical rod freely movable in the bearings, a heavy contact arm rigidly fixed to said rod, said plate having a cam to depress said arm when said rod is in a central position and raise the arm to engage said contacts selectively when the rod is moved in either direction, manual means for actuating said rod, and manually actuated resilient means to move said contact arm when operated in one direction, said means yielding when passing over the contact arm in an opposite direction.

7. A signal switch comprising a support, insulated contacts fixed in spaced relation on said support, a rod mounted on the support, a contact arm fixed to said rod, said arm having a heavy vertical head engageable with either of said contacts upon movement of the rod, and a cam plate having a slot through which said arm extends to partially rotate the rod when moved endwise, the weight of said head acting to normally maintain said arm in a neutral position.

8. A signal switch comprising an adjustable support, insulated contacts fixed in spaced relation on said support, a rod movably mounted in the support, and a gravity contactor arm rigid in said rod and having an upright head to directly engage either fixed contact upon sliding the rod in the selected turning direction.

9. A signal switch comprising a block, a pair of fixed contacts on said block, a perforate plate on the block having bearings, a rod slidable in said bearings, a contactor carried by the rod to engage either of said fixed contacts, means for manual actuation of said rod, yieldable means for moving said contactor from the contacts to neutral, and visual means to indicate the position of said contactor.

In testimony whereof I affix my signature.
RAPHAEL C. GALLINANT.